Figure 1:
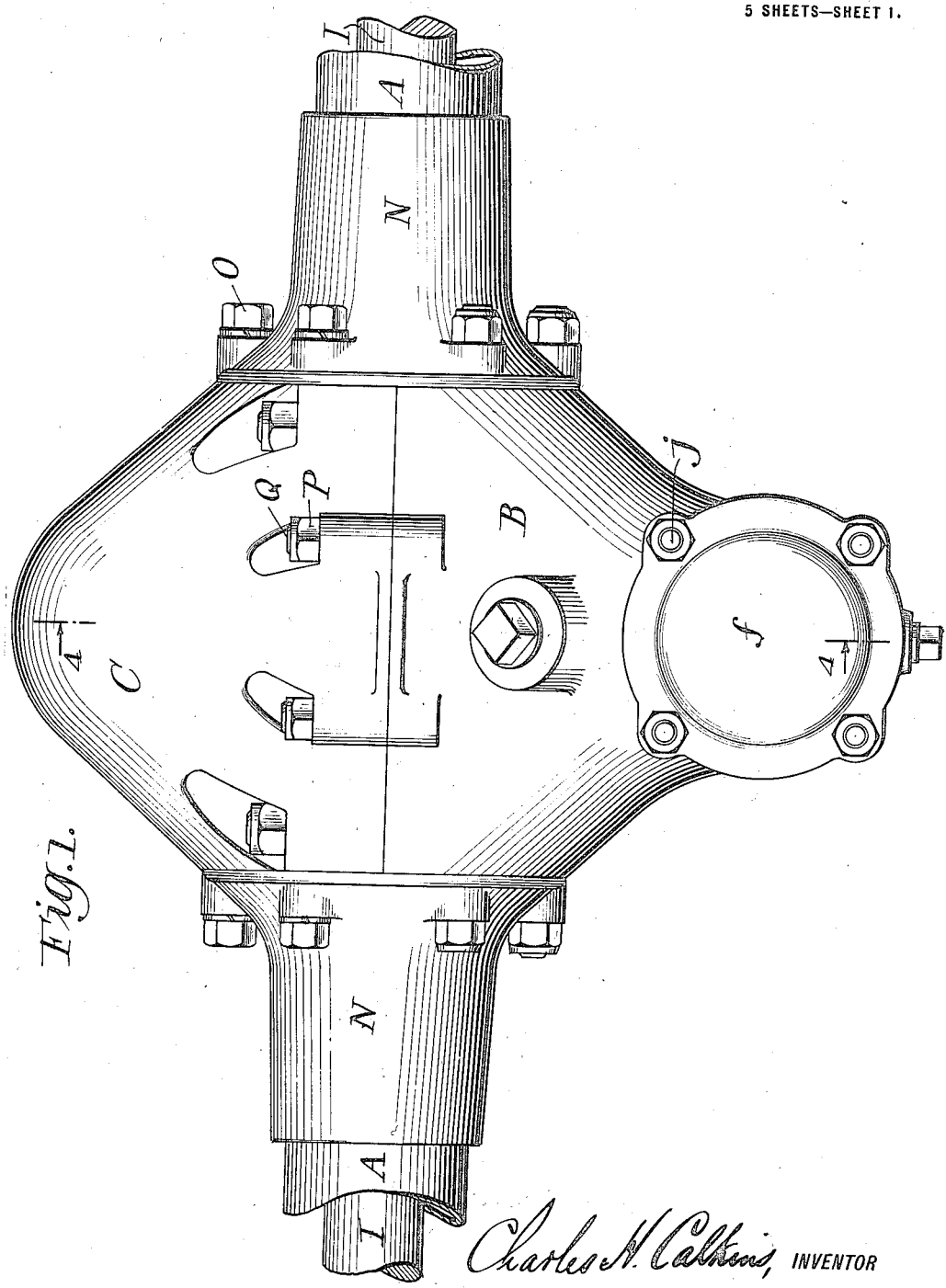

C. H. CALKINS.
DRIVING MECHANISM FOR MOTOR VEHICLES.
APPLICATION FILED JUNE 3, 1915.

1,211,673.

Patented Jan. 9, 1917.
5 SHEETS—SHEET 1.

Charles H. Calkins, INVENTOR

BY D. Anthony Usina, ATTORNEY

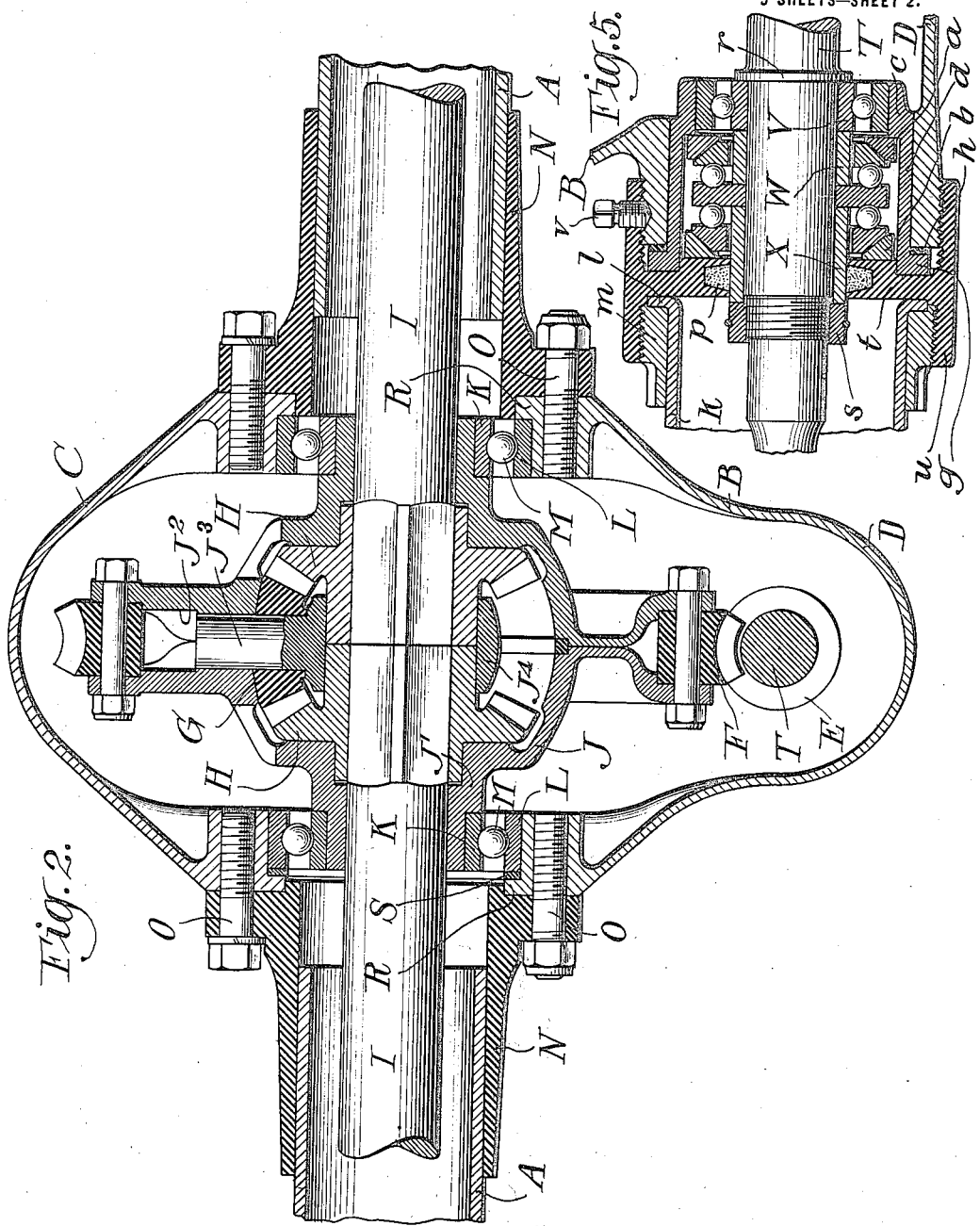

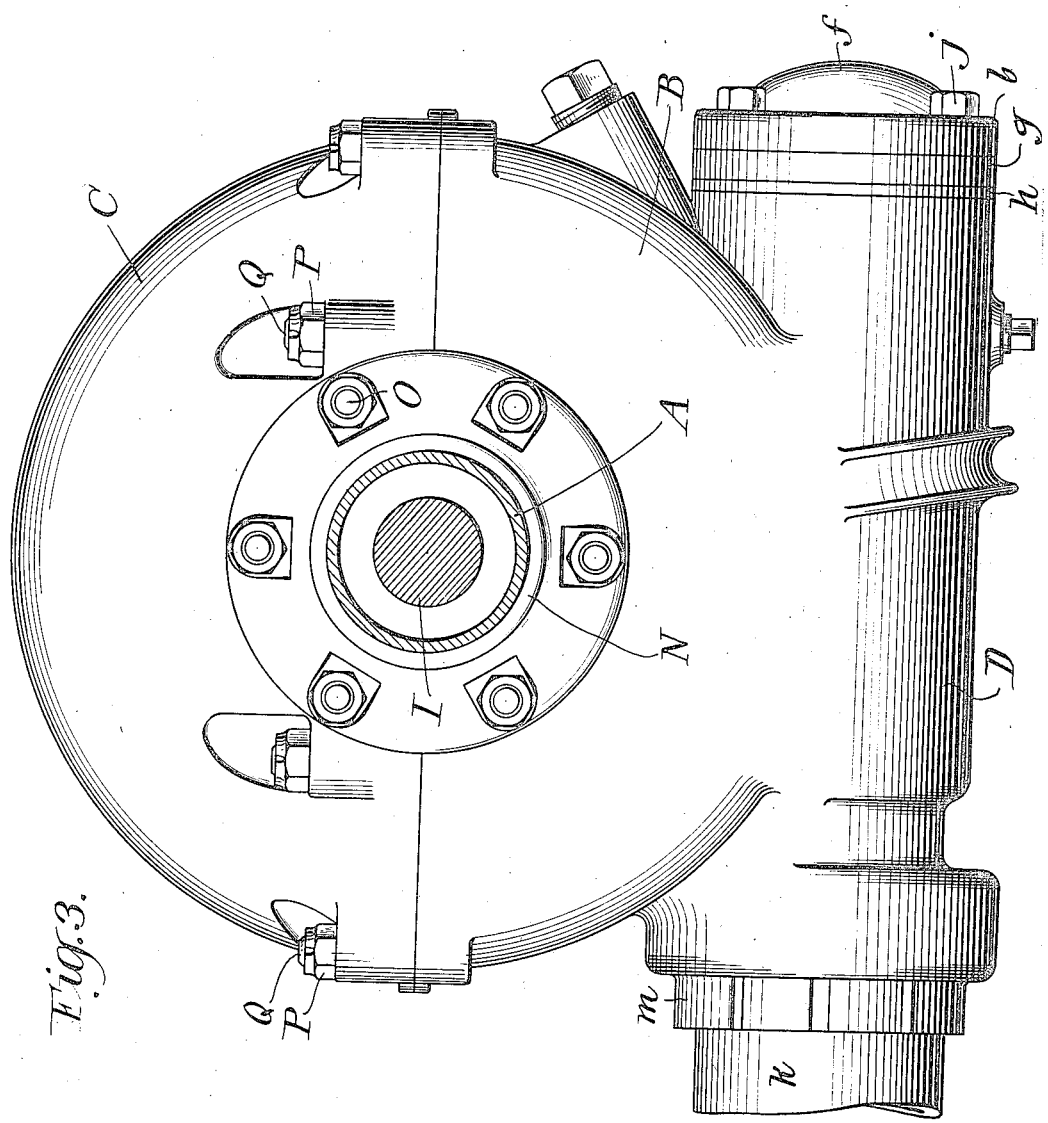

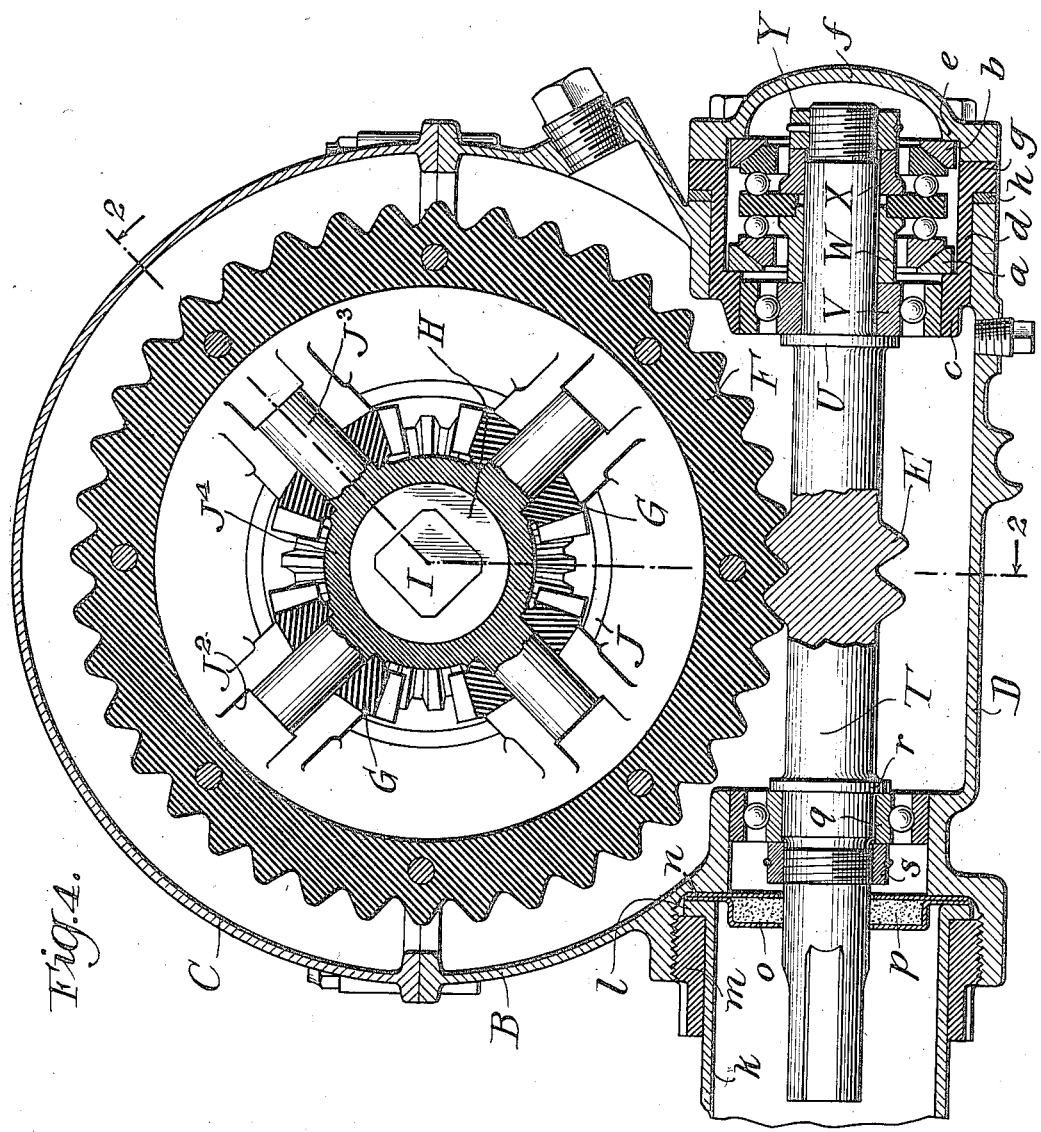

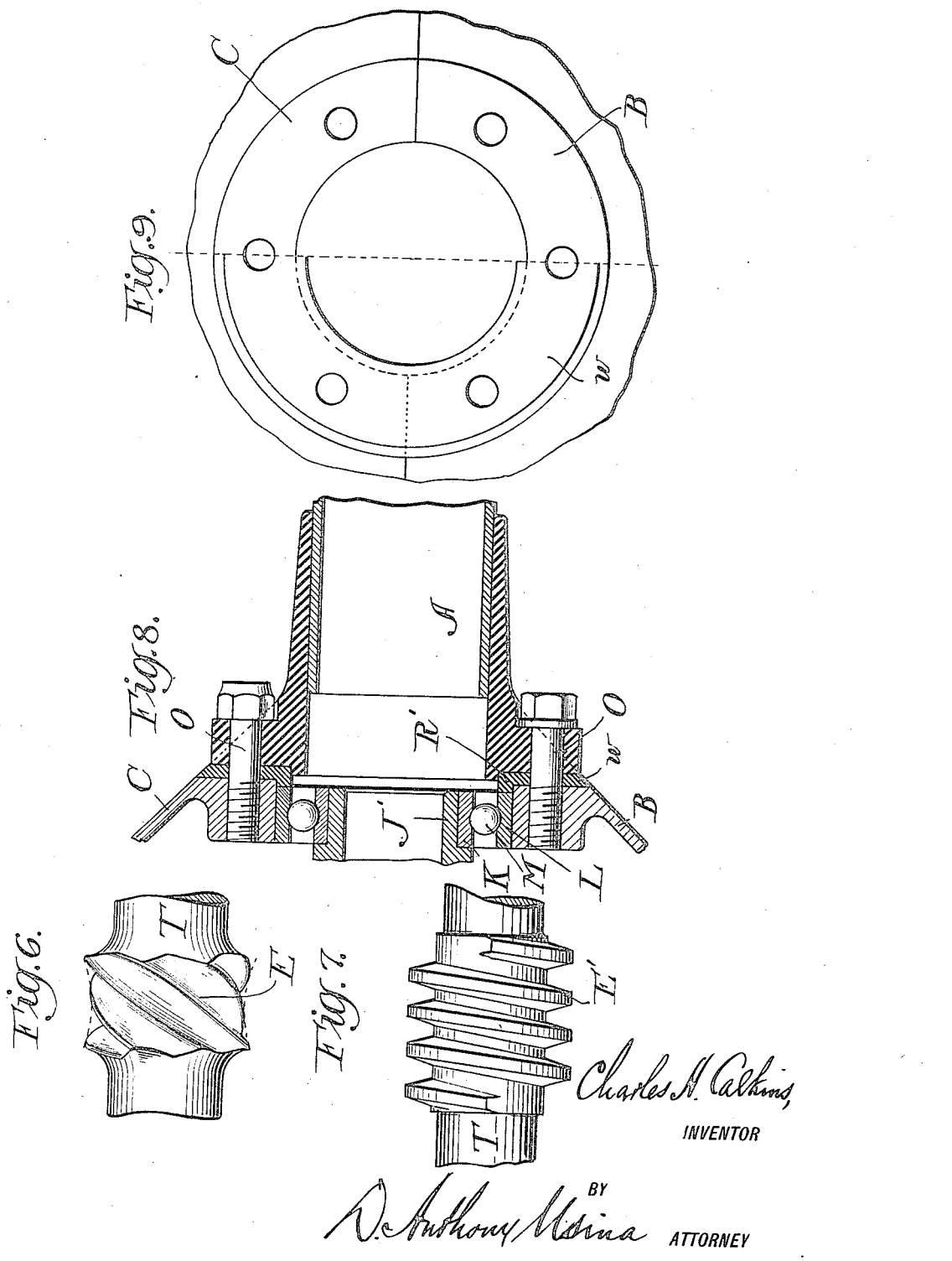

UNITED STATES PATENT OFFICE.

CHARLES H. CALKINS, OF LUDLOW, MASSACHUSETTS, ASSIGNOR TO BAUSH MACHINE TOOL COMPANY, A CORPORATION OF MASSACHUSETTS.

DRIVING MECHANISM FOR MOTOR-VEHICLES.

1,211,673.

Specification of Letters Patent. Patented Jan. 9, 1917.

Application filed June 3, 1915. Serial No. 31,886.

*To all whom it may concern:*

Be it known that I, CHARLES H. CALKINS, a citizen of the United States, residing in Ludlow, Massachusetts, have invented certain new and useful Improvements in Driving Mechanisms for Motor-Vehicles, of which the following is a specification.

This invention aims to provide an improved driving mechanism of the class usually provided in connection with the rear axle of automobiles whereby there is obtained a greater simplicity of construction, reliability of operation and accessibility of parts than in previous constructions of this class.

The accompanying drawings illustrate embodiments of the invention.

Figure 1 is a rear elevation of the central portion of the axle including the casing at the center which carries the driving mechanism; Fig. 2 is a longitudinal section of the same; Fig. 3 is a side elevation of the gear casing constituting the central portion of the axle; Fig. 4 is a transverse section through the same; Fig. 5 is a section similar to Fig. 4 showing an alternative construction; Figs. 6 and 7 are elevations of two different styles of worm; Fig. 8 is a section of a modified form for the end of the casing; Fig. 9 is a half elevation of the washer of Fig. 8 and a half elevation of the casing.

Referring now to the embodiment of the invention illustrated, the axle comprises a pair of end tubes A of the usual or any suitable type carrying the brake and wheels at their outer ends and fastened at their inner ends to a casing comprising a main portion B and a removable cover portion C, within which casing is carried the driving mechanism.

Integral with the main portion B of the casing, which carries the differential gearing hereinafter described, is a transverse tubular portion D which carries a worm E driving a worm gear F. Differential pinions G rotating on axes radial to the worm gear are carried around with the worm gear and serve to drive differential gears H rotating about the same axis as the worm gear. The gears H are squared for attachment to the ends of the driven shafts I which run to the wheels at opposite ends of the axle.

The worm gear comprises a ring bolted between the edges of plates J having tubular central portions J' which are recessed and form rotary and thrust bearings for the differential gears H, as shown in Fig. 2. The plates J are formed to provide, when assembled, sockets $J^2$ for the pivot pins $J^3$ of the differential pinions G, the several pins $J^3$ being formed on a ring $J^4$ surrounding the hubs of the differential gears H.

The plates J constituting the body of the worm gear have ball bearings mounted on their tubular ends consisting each of an inner ring K and an outer ring L with balls M between them. The portions B and C of the casing have their ends recessed to receive the bearings of the worm gear and to constitute bearing blocks, so that the upper portion C of the casing constitutes a removable cap of the bearing. The end portions A of the axle are preferably fastened by means of flanged castings N on their ends and by stud bolts O passing through the flanges and screwing into suitable threaded openings of the parts B and C of the casing. These two parts are fastened together by means of nuts P screwing on the ends of bolts Q which are fixed in the main portion B of the casing and extend from its upper edge through suitable lugs in the removable portion C.

The casing and the mechanism within it constitute a complete self contained unitary gear mount including the worm and gearing and all the necessary radial and thrust bearings. It can be assembled completely on the bench. With the end members A of the axle added it constitutes a complete axle. The cover portion C of the casing can be removed for inspection after the axle is completely assembled by removing the cap bolts O which fasten it to the end members of the axle and the nuts P which fasten it to the main portion of the casing.

The bearings of the differential gearing are fitted to the casing perfectly before or at the time of assembling and are assembled in permanently fixed positions in the casing, so that the removal and replacement of the cover does not alter their position and no adjustment of the bearings is necessary, nor are there any adjustable parts to work loose and cause trouble. The ball bearing ring L at one end bears directly against the shoulder or flange R provided in the end of the casing. At the other end a washer S is introduced between the bearing and the flange R. These washers are made in various thicknesses to make up for ordinary manufacturing variations in the casing, ball bearings and differential gearing. With a washer of proper thickness once fitted in place the parts are held permanently in fixed positions as above described. The center of the width of the worm gear F should for greatest efficiency be in line with the axis of the worm E and the parts may be so proportioned that this coincidence is secured when the right hand bearing (Fig. 2) bears directly against the flange R of the casing, the washer S at the opposite end holding it in this position, as described. Or a washer of the desired thickness may be used at each end in order to set the worm gear fixedly in proper relation to the worm. Or the washers could be dispensed with by machining the inner faces of the flanges R to fit each individual worm wheel, or by grinding off the outer end faces of the ball bearing rings L; only a small amount of metal having to be removed in either case. The use of washers S, however, is preferred as permitting a quicker fitting and assembling of the parts.

A similar method of fitting the worm shaft in a permanently fixed position is preferably adopted, such a construction being shown in Fig. 4. The worm shaft T is provided with a shoulder U limiting the inward position thereon of a radial bearing V and a double thrust bearing whose inner rings W and X are held in position by a holding ring Y threaded on the end of the shaft. The radial and thrust bearings are of known type and the latter has outer rings a and b which are held in position between the inner shoulder c of a sleeve d and the shoulder e of a removable end cap f. The sleeve d is formed with a flange g extending between the edge of the cap f and the end of the tubular portion D of the casing and a washer h is inserted between the latter and the flange g of such a thickness as to maintain the worm E with its center in a permanently fixed position in line with the center of the worm gear F. Instead of using a washer h the parts may be machined to set the shaft in the desired position in assembling, but the washer is preferred. The sleeve d being inserted in the casing and set in the determined position, the cap f is applied to the outer end and fastened by means of stud bolts j, which pass through the cap, flange g and washer h into the main casing so as to hold the sleeve and its inclosed bearing in place.

The worm shaft T has its outer end grooved for attachment of a driving shaft thereto. Extending from this end of the portion D of the main casing is a tube k, known as the torque tube. In my improved construction I prefer to make this of sheet metal with a flange l on its end against which engages a ring m screw threaded into the end of the portion D of the main casing. This permits a quick setting up or detachment of the torque tube. Between the flange l and the body of the casing I arrange the flange n of a sheet metal annular box o filled with packing p adapted to keep out dust. This end of the shaft T is provided with a radial ball bearing, the inner ring q of which is held between a shoulder r on the shaft and a setting up ring s threaded on the shaft.

Various other designs and arrangements of the bearings of the worm shaft may be used. For example, the thrust bearing may be applied near the driven end of the shaft as illustrated in Fig. 5, and in this case also I may use a method of attaching the torque tube similar to that shown in Fig. 4. The inner rings V, W and X of the bearings will be held between the shoulder r and the threaded setting up ring s and the outer rings a and b of the thrust bearing will be held between a shoulder c of the sleeve d and a diaphragm t, corresponding in its function of holding the bearings to the cap f at the opposite end of the casing in Fig. 4. The flange g of the sleeve d is held in the determined fixed position by means of a washer h and the parts are held together by screwing a nut u onto the end of the portion D of the casing, the diaphragm t constituting a part of this nut. This diaphragm has also a central space filled with packing p surrounding the shaft. A set screw v holds the nut in place on the casing. The threaded ring m which fastens the torque tube in place screws in this case into a threaded outward extension of the nut u and clamps the flange l of the torque tube against the diaphragm t of the set nut. This arrangement permits the unscrewing of the ring m and the removal of the torque tube entirely, as might be necessary in a garage, without disturbing the worm or the position of the ball bearing.

The invention is shown and described as applied to the rear axle of an automobile, but it can be applied to any driving axle. Also the worm may be mounted above the gearing instead of below it as shown. I prefer the arrangement shown, however, because it permits removal of the cover portion C of the casing without removing any of the mechanism, whereas if the parts were inverted the main portion B would constitute the removable portion of the cover and would lift the worm with it.

The squared ends of the shaft I may be substituted by a keyed or splined arrangement, these being known equivalents. Similarly the end of the worm shaft T instead of being grooved as shown for a spline, might be squared.

As shown in Fig. 2 the axle is of the full floating type, the driven shafts I sliding freely in the hubs of the gears H. The invention may be applied equally as well to an axle of the semi-floating type, in which case the shafts I would be fastened permanently in the gears H. That is, they could not be removed without the use of tools. They might, for example, be fastened by a nut located at the inside ends of the hubs of the gears.

The worm on the shaft T is most efficient when made of the hour glass type, Figs. 4 and 6, which when rotated presents a concave appearance on its longitudinal sides as shown by the dotted lines in Fig. 6. A straight worm E', Fig. 7, may be used, however, with the advantage of avoiding the necessity for accurate placement of the worm in an endwise direction. That is to say, the hour glass type of worm requires to be placed with its longitudinal center in line with the center of contact between the worm and the gear; whereas the straight worm can depart longitudinally from such a position without loss of efficiency.

The ball bearings shown at K, L, M, and at other parts of the mechanism may be replaced by rollers or other anti-friction bearings, if preferred.

Instead of forming a thrust shoulder R directly upon the castings B and C I may utilize the design shown in Figs. 8 and 9, with certain mechanical advantages. In this design a separate washer $w$ constituting a complete circle, one-half of which is shown in Fig. 9, is fitted upon the ends of the castings B and C and fastened by means of bolts O as in the previously described construction. The washer projects inward beyond the face of the castings to take the thrust of the ring L of the ball bearing. Since there is no shoulder formed directly on the castings B and C, a straight machining cut can be taken through them, which makes their manufacture simpler and cheaper. Furthermore, the washer carrying the shoulder R' in a continuous ring provides a better and stronger abutment for the thrust of the bearing ring L. The ends of the upper portion C of the casing still constitute caps for the bearings, which caps can be removed by withdrawing the bolts O and lifting the casting C, leaving the ball bearings and intermediate parts exposed, but not disturbing their longitudinal position, in which they are held by the washer $w$.

Various other modifications may be made by those skilled in the art without departing from the invention as defined in the following claims.

What I claim is—

1. A worm gear axle mount comprising in combination a worm and a worm gear driven thereby, driven shaft gears, differential gearing driven by said worm gear and driving said driven shaft gears differentially, the body of said worm gear being shaped to constitute bearings for said differential gearing and said driven shaft gears and a casing inclosing said worm and gears and shaped to constitute bearings for said worm and worm gear, the portion of the casing which incloses the worm being formed in a single integral piece from end to end.

2. A worm gear axle mount comprising in combination a worm and a worm gear driven thereby, driven shaft gears, differential gearing driven by said worm gear and driving said driven shaft gears differentially, the body of said worm gear being shaped to constitute bearings for said differential gearing and said driven shaft gears and a casing inclosing said worm and gears and shaped to constitute bearings for said worm and worm gear, said casing including a main portion B, a removable cover portion C and a transverse tubular portion D inclosing the entire length of the worm and formed in a single integral piece with the main portion B.

3. A worm gear axle mount comprising in combination a worm and a worm gear driven thereby, driven shaft gears, differential gearing driven by said worm gear and driving said driven shaft gears differentially, the body of said worm gear being shaped to constitute bearings for said differential gearing and said driven shaft gears and a casing having a portion inclosing said differential gearing and a second portion integral with the first and inclosing said worm.

4. A worm gear axle mount including in combination a worm and a worm gear driven thereby, driven shaft gears, differential gearing driven by said worm gear and driving said driven shaft gears differentially, a casing having a portion inclosing said differential gearing and a second portion integral with the first and inclosing said worm, and a thrust bearing for said worm fitted in permanently fixed position in said second portion of the casing.

5. A differential driving mechanism including in combination a driving gear, driven shafts, differential gearing driven by said driving gear and driving said shafts differentially, bearings for said differential gearing, and a casing inclosing said mechanism, a flanged torque tube adapted to surround a driving shaft of said driving gear and a ring surrounding said tube and engaging the flange thereof and having a threaded engagement with said casing to fasten said tube to the casing.

In witness whereof I have hereunto signed my name.

CHARLES H. CALKINS.